United States Patent
Lim et al.

(10) Patent No.: US 11,001,677 B2
(45) Date of Patent: May 11, 2021

(54) THERMOPLASTIC POLYMER PARTICLES HAVING LOW IMPURITY CONTENT

(71) Applicant: LG Hausys, Ltd., Seoul (KR)

(72) Inventors: Jae Ho Lim, Seoul (KR); Sung Yong Kang, Seoul (KR); Kyoung Min Kang, Seoul (KR); Hee-Jung Lee, Seoul (KR); Min Gyung Kim, Seoul (KR); Chang-Young Park, Seoul (KR); Jun Ho Choi, Seoul (KR); Jae Han Song, Seoul (KR); Yu Jin Go, Seoul (KR)

(73) Assignee: LG Hausys, Ltd.

( * ) Notice: Subject to any disclaimer, the term of this patent is extended or adjusted under 35 U.S.C. 154(b) by 0 days.

(21) Appl. No.: 16/491,368

(22) PCT Filed: Mar. 9, 2018

(86) PCT No.: PCT/KR2018/002845
§ 371 (c)(1),
(2) Date: Sep. 5, 2019

(87) PCT Pub. No.: WO2018/164540
PCT Pub. Date: Sep. 13, 2018

(65) Prior Publication Data
US 2020/0071470 A1    Mar. 5, 2020

(30) Foreign Application Priority Data

Mar. 9, 2017 (KR) .................. 10-2017-0030178
Mar. 9, 2017 (KR) .................. 10-2017-0030179
(Continued)

(51) Int. Cl.
*B32B 5/16* (2006.01)
*C08J 3/12* (2006.01)
(Continued)

(52) U.S. Cl.
CPC . *C08J 3/12* (2013.01); *B01J 2/04* (2013.01); *B01J 2/20* (2013.01); *B29B 9/10* (2013.01);
(Continued)

(58) Field of Classification Search
CPC ..... B29B 2009/166; B29B 9/12; B29B 9/125; B29B 13/022; B29B 13/045
See application file for complete search history.

(56) References Cited

U.S. PATENT DOCUMENTS 3,647,340 A    3/1972  Sakurai et al.
3,937,772 A    2/1976  Urban et al.
(Continued)

FOREIGN PATENT DOCUMENTS

DE    102007027543 A1    5/2008
EP         1920825 A1    5/2008
(Continued)

OTHER PUBLICATIONS

International Search Report for Application No. PCT/KR2018/002843, dated Jul. 24, 2018, pp. 1-2.
(Continued)

*Primary Examiner* — Hoa (Holly) Le
(74) *Attorney, Agent, or Firm* — Lerner, David, Littenberg, Krumholz & Mentlik, LLP

(57) ABSTRACT

Provided are thermoplastic polymer particles having an aspect ratio of 1.00 or more and less than 1.05, and a roundness of 0.95 to 1.00. The thermoplastic polymer particles are formed from a thermoplastic polymer resin in a continuous matrix phase. The thermoplastic polymer particles show a peak cold crystallization temperature ($T_{cc}$) at a temperature between a glass transition temperature ($T_g$) and the melting point ($T_m$) in a differential scanning calorimetry (DSC) curve which is derived from temperature rise analysis at 10° C./min by differential scanning calorimetry.

5 Claims, 3 Drawing Sheets

(30) Foreign Application Priority Data

Sep. 18, 2017 (KR) ........................ 10-2017-0119573
Mar. 8, 2018 (KR) ........................ 10-2018-0027661

(51) Int. Cl.

| C08L 67/04 | (2006.01) |
|---|---|
| C08G 63/06 | (2006.01) |
| B01J 2/20 | (2006.01) |
| B29B 9/10 | (2006.01) |
| B01J 2/04 | (2006.01) |
| B29B 9/12 | (2006.01) |
| B29K 67/00 | (2006.01) |

(52) U.S. Cl.

CPC .............. *C08G 63/06* (2013.01); *C08L 67/04* (2013.01); *B29B 2009/125* (2013.01); *B29K 2067/046* (2013.01); *C08J 2367/04* (2013.01); *C08J 2375/04* (2013.01); *C08L 2203/30* (2013.01)

(56) References Cited

U.S. PATENT DOCUMENTS

| 5,525,274 | A | 6/1996 | Grimmer |
| 5,609,979 | A * | 3/1997 | Lawson .................... C08J 3/03 430/109.1 |
| 6,190,773 | B1 | 2/2001 | Imamura et al. |
| 6,527,995 | B1 | 3/2003 | Kaufhold et al. |
| 6,733,845 | B1 | 5/2004 | Caramaro et al. |
| 8,710,144 | B2 | 4/2014 | Hesse et al. |
| 2002/0099162 | A1 | 7/2002 | Iwanaga et al. |
| 2005/0142206 | A1* | 6/2005 | Brown .................... B01J 13/06 424/490 |
| 2005/0207931 | A1 | 9/2005 | Hesse et al. |
| 2006/0067895 | A1 | 3/2006 | Miyamoto et al. |
| 2006/0204604 | A1 | 9/2006 | Yamanaka et al. |
| 2006/0235188 | A1* | 10/2006 | Weinhold .............. C08G 63/88 528/272 |
| 2008/0026955 | A1 | 1/2008 | Munoz et al. |
| 2008/0103277 | A1* | 5/2008 | Campbell .................. C08J 3/12 526/318.3 |
| 2008/0122132 | A1* | 5/2008 | Kinoshita ................. B01J 2/20 264/12 |
| 2008/0152910 | A1 | 6/2008 | Hesse et al. |
| 2009/0280423 | A1 | 11/2009 | Yahiro et al. |
| 2010/0133717 | A1 | 6/2010 | Boczon et al. |
| 2010/0227985 | A1 | 9/2010 | Nishiguchi et al. |
| 2012/0270048 | A1 | 10/2012 | Saigusa et al. |
| 2013/0234350 | A1 | 9/2013 | Osswald |
| 2013/0289055 | A1 | 10/2013 | Boit et al. |
| 2013/0309497 | A1 | 11/2013 | Takezaki et al. |
| 2014/0024797 | A1 | 1/2014 | Nishiguchi et al. |
| 2016/0208057 | A1 | 7/2016 | Baer et al. |
| 2016/0208070 | A1 | 7/2016 | Shin et al. |
| 2018/0133685 | A1 | 5/2018 | Lu et al. |
| 2019/0276611 | A1 | 9/2019 | Kuwagaki et al. |
| 2020/0032005 | A1* | 1/2020 | Kim ........................ B01J 2/04 |
| 2020/0032049 | A1* | 1/2020 | Kang ....................... B01J 2/04 |
| 2020/0071470 | A1 | 3/2020 | Lim et al. |
| 2020/0316819 | A1* | 10/2020 | Lee ......................... B01J 2/04 |

FOREIGN PATENT DOCUMENTS

| EP | 2732945 A1 | 5/2014 |
| JP | S59226024 A | 12/1984 |
| JP | 2000007789 A | 1/2000 |
| JP | 2000052341 A | 2/2000 |
| JP | 2000313729 A | 11/2000 |
| JP | 2001288273 A | 10/2001 |
| JP | 2002283341 A | 10/2002 |
| JP | 2004269598 A | 9/2004 |
| JP | 2004269865 A | 9/2004 |
| JP | 2005097480 A | 4/2005 |
| JP | 2006002097 A | 1/2006 |
| JP | 2006124366 A | 5/2006 |
| JP | 2007535585 A | 12/2007 |
| JP | 2008070583 A | 3/2008 |
| JP | 2008137377 A | 6/2008 |
| JP | 2008163290 A | 7/2008 |
| JP | 2009029860 A | 2/2009 |
| JP | WO2009051104 A1 | 3/2011 |
| JP | 2012224809 A | 11/2012 |
| JP | 2014504305 A | 2/2014 |
| JP | 2014047304 A | 3/2014 |
| JP | 2016536412 A | 11/2016 |
| JP | 2016536420 A | 11/2016 |
| JP | 2018135493 A | 8/2018 |
| KR | 20000073060 A | 12/2000 |
| KR | 20010031742 A | 4/2001 |
| KR | 20010049784 A | 6/2001 |
| KR | 20070068490 A | 6/2007 |
| KR | 101292498 B1 | 8/2013 |
| KR | 20150117782 A | 10/2015 |
| KR | 20150126517 A | 11/2015 |

OTHER PUBLICATIONS

International Search Report for PCT/KR2018/002846 dated Jul. 24, 2018.
International Search Report for PCT/KR2018/002848 dated Jun. 28, 2018.
International Search Report for Application No. PCT/KR2018/002845, dated Jul. 24, 2018, pp. 1-4.
Anonymous, "Hot Cutting PP/PE Plastic Recycling Machine Air Cooled plastic granulator machine," Dec. 22, 2016, pp. 1-2, XP055744893.
Extended European Search Report with Written Opinion for Application No. 18764218.6 dated Nov. 20, 2020, 11 pages.
Vasanthavada et al, "Application of Melt Granulation Technology Using Twin-screw Extruder in Development of High-dose Modified-release Tablet Formulation", Journal of Pharmaceutical Sciences, May 23, 2011, pp. 1923-1934, vol. 100, No. 5, XP055128566.

* cited by examiner

[Figure 1]
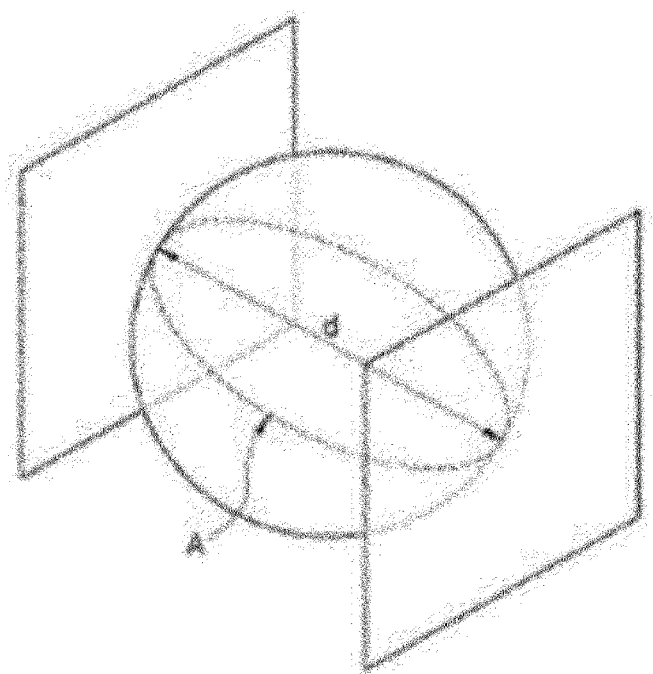

【Figure 2】
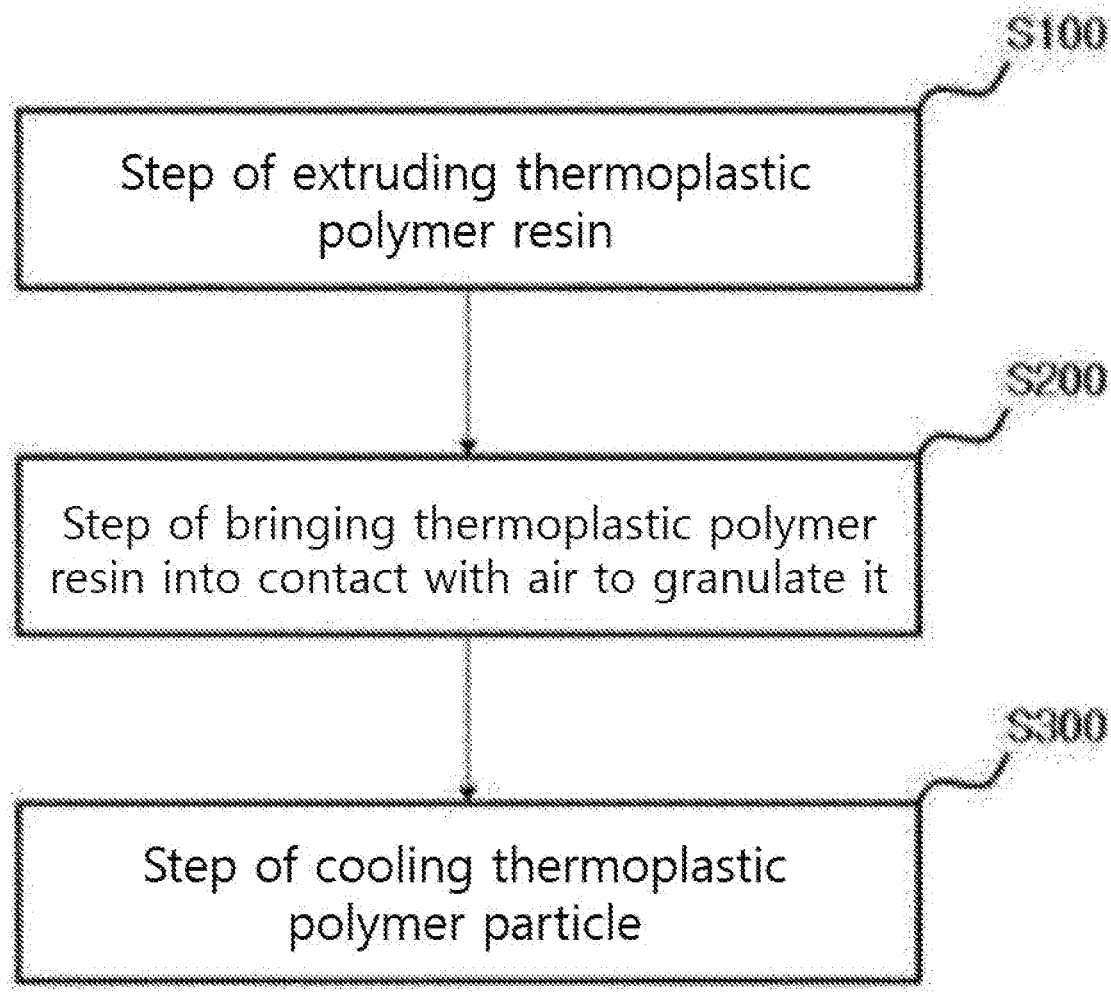

[Figure 3]
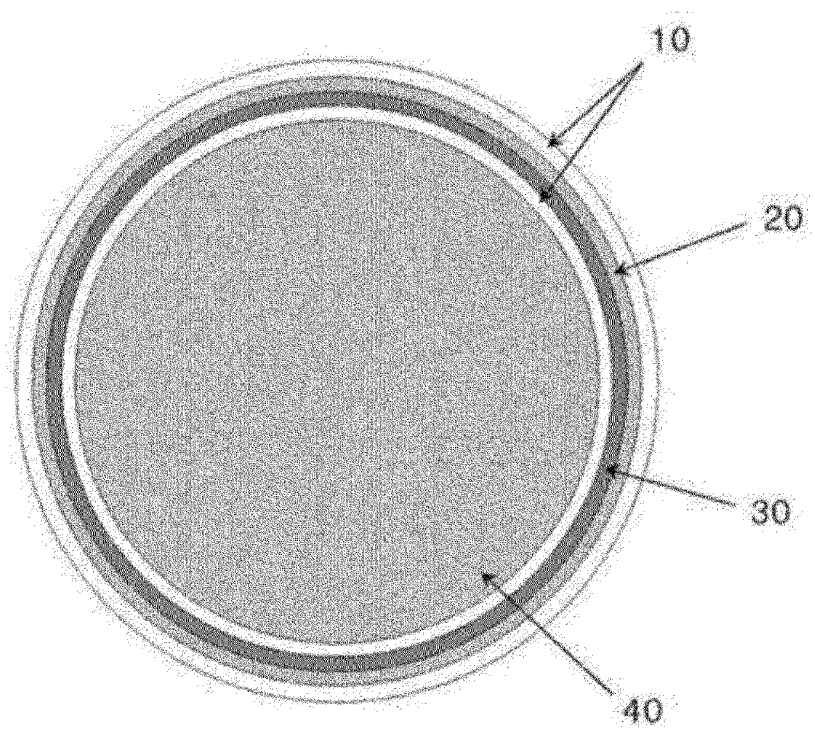

THERMOPLASTIC POLYMER PARTICLES HAVING LOW IMPURITY CONTENT

CROSS-REFERENCE TO RELATED APPLICATIONS

This application is a national phase entry under 35 U.S.C. § 371 of International Application No. PCT/KR2018/002845, filed Mar. 9, 2018, which claims priorities based on Korean Patent Application Nos. 10-2017-0030178 and 10-2017-0030179, filed on Mar. 9, 2017, Korean Patent Application No. 10-2017-0119573, filed on Sep. 18, 2017, and Korean Patent Application No. 10-2018-0027661, filed on Mar. 8, 2018, the entire contents of which are incorporated herein by reference.

TECHNICAL FIELD

The present invention relates to thermoplastic polymer particles.

BACKGROUND ART

Polymer resins in the form of particles are used in various ways throughout the industry. Such polymer resin particles are manufactured through a process of granulating a raw material of polymer resin.

In general, as a manufacturing method of thermoplastic polymer particles, there are a crushing method represented by a freeze-crushing method; a solvent dissolution-precipitation method which makes it precipitate by dissolving in a high temperature solvent and then cooling or which makes it precipitate by dissolving in a solvent and then adding a bad solvent; a melt kneading method which obtains thermoplastic resin particles by mixing the thermoplastic resin and the incompatible resin in the mixer to form a composition having the thermoplastic resin in the dispersed phase and the thermoplastic resin and the incompatible resin in the continuous phase, and then removing the incompatible resin; and the like.

If the particles are manufactured by the crushing method, there is a problem that it is difficult to secure the particles uniformity of the manufactured thermoplastic polymer resin particles. In addition, the crushing method requires a high cost compared to the particle obtaining process because liquid nitrogen is used during cooling. If a compounding process for adding pigments, antioxidants, etc. to the raw material of the thermoplastic polymer resin is added, since the process proceeds batchwise, the productivity is low as compared to that of the continuous particle obtaining process. If the particles are manufactured by the solvent dissolution precipitation method and the melt kneading method, there is a problem that in addition to the thermoplastic resin particles, other components such as a solvent may be detected as impurities. When impurities are incorporated in the process, it is not only difficult to manufacture the particles purely made of only a thermoplastic polymer resin, but also highly susceptible to deformation of physical properties and shapes of the particles, and also it is difficult to control them finely.

Due to the above-described problems, it is not possible to manufacture thermoplastic polymer resin particles having suitable physical properties for application to products by conventional methods. Accordingly, there is a need in the art for thermoplastic polymer resin particles having improved physical properties by improving conventional methods.

PRIOR ART DOCUMENT

Patent Document (Patent Document 1) Japanese Laid-open Patent Publication No. 2001-288273
(Patent Document 2) Japanese Laid-open Patent Publication No. 2000-007789
(Patent Document 3) Japanese Laid-open Patent Publication No. 2004-269865

DISCLOSURE

Technical Problem

The present invention is to provide thermoplastic polymer particles having physical properties which effectively prevent the incorporation of impurities other than the resin component in the particles by extruding a thermoplastic polymer resin, granulating the extruded resin by contact with air, and cooling it to manufacture thermoplastic polymer particles, and which can be controlled so that the particles have physical properties that can be widely utilized.

Technical Solution

According to the first aspect of the invention,
The present invention provides thermoplastic polymer particles having an aspect ratio calculated by Formula 1 of 1.00 or more and less than 1.05, and a roundness calculated by Formula 2 of 0.95 to 1.00.

Aspect ratio=major axis/minor axis, [Formula 1]

Roundness=4×area/(Π×major axis^2). [Formula 2]

In one embodiment of the present invention, the thermoplastic polymer particles are formed as a continuous matrix phase from the thermoplastic polymer resin.

In one embodiment of the present invention, the thermoplastic polymer particles have a peak of cold crystallization temperature ($T_{cc}$) at a temperature between the glass transition temperature ($T_g$) and the melting point ($T_m$) in the differential scanning calorimetry (DSC) curve derived from temperature rise analysis of 10° C./min by the DSC.

In one embodiment of the present invention, the thermoplastic polymer is at least one polymer selected from the group consisting of polylactic acid (PLA), thermoplastic polyurethane (TPU), polyethylene (PE), polypropylene (PP), polyether sulfone (PES), poly(methyl methacrylate) (PMMA) and ethylene vinyl-alcohol copolymer (EVOH). In one embodiment of the present invention, the thermoplastic polymer particles have a particle diameter of 1 to 1000 μm.

According to a second aspect of the invention, the present invention provides a method for manufacturing thermoplastic polymer particles comprising supplying a thermoplastic polymer resin to an extruder and extruding it; supplying the extruded thermoplastic polymer resin and air to the nozzle, bringing the thermoplastic polymer resin into contact with the air to granulate the thermoplastic polymer resin, and then discharging granulated thermoplastic polymer resins; and supplying the discharged thermoplastic polymer particles to a cooling unit to cool the thermoplastic polymer particles, and then collecting cooled thermoplastic polymer particles.

Advantageous Effects

Since the thermoplastic polymer particles according to the present invention have a nearly spherical shape, the handling and processing characteristics of the particles are excellent. Since the thermoplastic polymer particles are formed as a continuous matrix phase from the thermoplastic polymer resin and contain little impurities in the particles, there are few defects in the products manufactured by processing the particles. In addition, since the thermoplastic polymer particles have a peak of cold crystallization temperature ($T_{cc}$) in the DSC curve, when the particles are heated and processed, thermal energy is generated by heat generation, and thus the particles can be easily processed even with a small supply of thermal energy.

DESCRIPTION OF DRAWINGS

FIG. 1 is an image schematically showing the shape of a thermoplastic polymer particle of the present invention.

FIG. 2 is a process flow chart schematically showing a method for manufacturing thermoplastic polymer particles according to the present invention.

FIG. 3 is a cross-sectional view of a nozzle outlet showing a supply position of a thermoplastic polymer resin and air to a nozzle according to an embodiment of the present invention.

BEST MODE

Embodiments provided according to the present invention can all be achieved by the following description. It is to be understood that the following description describes preferred embodiments of the invention, and the invention is not necessarily limited thereto.

In the following specification, for the numerical range, the expression "to" is used to include both the upper and lower limits of the range, and when not including the upper limit or the lower limit, the expression "less than", "more than", "no more than", or "no less than" is used in order to specifically indicate whether or not to include the upper limit or the lower limit.

The present invention provides thermoplastic polymer particles which could not be obtained by conventional particle manufacturing methods. Hereinafter, the thermoplastic polymer particles according to the present invention will be described in detail.

Thermoplastic Polymer Particles

The present invention provides thermoplastic polymer particles having a shape close to a spherical shape. In the present invention, the shape of the particles is evaluated by the following aspect ratio and roundness. The closer the aspect ratio and roundness is to 1, the closer the shape of the particle is to the sphere. The aspect ratio is calculated by the following Formula 1.

Aspect ratio=major axis/minor axis. [Formula 1]

In addition, the roundness is calculated by the following Formula 2.

Roundness=4×area/(Π×major axis^2) [Formula 2]

In order to explain the Formulas in detail, FIG. 1 is provided which schematically illustrates thermoplastic polymer particles. According to FIG. 1, in Formulas 1 and 2, the "major axis" means the longest distance among the vertical distances (d) between two parallel tangent lines of the 2D image (cross-section) of the thermoplastic polymer particle, and the "minor axis" means the shortest distance among the vertical distances (d) between two parallel tangent lines of the 2D image (cross-section) of the thermoplastic polymer particle. In addition, in Formula 2, the "area" means the area of the cross section including the major axis of the thermoplastic polymer particle. FIG. 1 illustrates an area (A) as an example when the vertical distance (d) between two parallel tangent planes of the thermoplastic polymer particles is a major axis.

The thermoplastic polymer particles according to the present invention may have an aspect ratio of 1.00 or more and less than 1.05, more specifically 1.02 or more and less than 1.05, and may have a roundness of 0.95 to 1.00, more specifically 0.98 to 1.00. If the shape of the thermoplastic polymer particles satisfies the above-described aspect ratio and roundness ranges, the flowability and uniformity of the thermoplastic polymer particles are increased, so that the particles are easily handled, and products made by the particles described above also have improved quality by suppressing defects such as internal voids.

The numerical values according to Formulas 1 and 2 can be measured by image-processing an image of thermoplastic polymer particles using ImageJ (National Institutes of Health (NIH)), and converting them into a binary image and then digitizing the degree of spherical shape of individual particles.

The thermoplastic polymer particles according to the present invention are particles formed as a continuous matrix phase from the thermoplastic polymer resin. Forming as a continuous matrix phase from the thermoplastic polymer resin means that the thermoplastic polymer resin forms a continuous dense structure without additional components. By extruding the thermoplastic polymer resin, melting and granulating the melt with air, thermoplastic polymer particles are produced continuously with a dense structure. In contrast, according to the conventional manufacturing method, since particles are formed by adding additional components or particles are formed through a discontinuous process of cooling and crushing, the particles are not formed as a continuous matrix phase.

The particles formed as a continuous matrix phase from thermoplastic polymer resins have a high purity because they do not contain impurities during the manufacture of the particles. Here, "impurity" means a component other than thermoplastic polymer, which may be incorporated in the manufacture of the particles. Exemplary impurities are a solvent for dispersing the thermoplastic polymer resin, heavy metal components included in the grinding or grinding process, unreacted monomers included in the polymerization process, and the like. According to one embodiment of the present invention, the impurity content of the thermoplastic polymer particles of the present invention may be 50 ppm or less, preferably 20 ppm or less, more preferably 5 ppm or less.

In addition, the particles may additionally have other properties as well as purity. As one of these properties, the thermoplastic polymer particles have a peak of cold crystallization temperature ($T_{cc}$) at a temperature between the glass transition temperature ($T_g$) and the melting point ($T_m$) in the differential scanning calorimetry (DSC) curve derived from temperature rise analysis of 10° C./min by the DSC. The thermoplastic polymer particles are spherical solid particles at room temperature. When these particles are subjected to temperature rise analysis using differential scanning calorimetry, the thermoplastic polymer particles have a peak of cold crystallization temperature ($T_{cc}$) at a temperature between the glass transition temperature ($T_g$) and the melting point ($T_m$), which means that the thermoplastic polymer particles have a property of generating heat before melting. In the present specification, the peak of cold crystallization temperature ($T_{cc}$) refers to only the peak of cold crystallization temperature ($T_{cc}$) that appears when the temperature rise analysis is first performed on the thermoplastic polymer particles for the first time, and the peak of the cold crystallization temperature ($T_{cc}$), which may occur as the internal structure of the particle is modified by repetitive temperature rise thereafter, is not included in the characteristics of the particles described herein. If the peak of cold crystallization temperature ($T_{cc}$) is caused by repetitive temperature rise, since energy for repetitive temperature rise is consumed, and thus it does not have an advantage in terms of energy when processing the particles. According to one embodiment of the present invention, the cold crystallization temperature ($T_{cc}$) is shown in a 30% to 70% section between the glass transition temperature ($T_g$) and the melting point ($T_m$). In this section, 0% is the glass transition temperature ($T_g$) and 100% is the melting point ($T_m$). In addition, according to the DSC curve, the thermoplastic polymer particles may have a difference ($\Delta H1 - \Delta H2$) of 3 to 100 J/g between an endothermic amount ($\Delta H1$) and an exothermic amount ($\Delta H2$). By these features, when performing the heating process using the thermoplastic polymer particles, it is possible to obtain an advantage that can be processed at a low temperature as compared to the processing temperature of conventional thermoplastic polymer particles.

Thermoplastic polymer in the present invention is not particularly limited. According to one embodiment of the present invention, the thermoplastic polymer may be at least one polymer selected from the group consisting of polylactic acid (PLA), thermoplastic polyurethane (TPU), polyethylene (PE), polypropylene (PP), polyether sulfone (PES), poly(methyl methacrylate) (PMMA) and ethylene vinyl-alcohol copolymer (EVOH).

The particle diameter of the thermoplastic polymer particles can be freely adjusted at the time of producing the particles by the manufacturing method according to the present invention. However, when the particle diameter of the thermoplastic polymer particles is adjusted to 1 to 1000 μm, more specifically 1 to 500 μm, thermoplastic polymer particles may be preferably used in consideration of handling properties together with the physical properties.

Thermoplastic polymer particles having the above-mentioned characteristics are manufactured by the following manufacturing method. Hereinafter, a manufacturing method of thermoplastic polymer particles according to the present invention will be described in detail.

Manufacturing Method of Thermoplastic Polymer Particles

FIG. 2 schematically illustrates a process flow diagram for the manufacturing method. The manufacturing method comprises supplying a thermoplastic polymer resin to an extruder and extruding it (S100); supplying the extruded thermoplastic polymer resin and air to the nozzle, bringing the thermoplastic polymer resin into contact with the air to granulate the thermoplastic polymer resin, and then discharging granulated thermoplastic polymer resins (S200); and supplying the discharged thermoplastic polymer particles to a cooling unit to cool the thermoplastic polymer particles, and then collecting cooled thermoplastic polymer particles (S300). Hereinafter, each step of the manufacturing method will be described in detail.

In order to manufacture thermoplastic polymer particles according to the present invention, first, a thermoplastic polymer resin as a raw material is supplied to an extruder and extruded. By extruding the thermoplastic polymer resin, the thermoplastic polymer resin has physical properties suitable for processing particles in the nozzle. The thermoplastic polymer resin used as a raw material is not particularly limited as long as it is a substance that can be granulated according to the manufacturing method of the present invention, but preferably may preferably have a weight average molecular weight (Mw) of 10,000 to 200,000 g/mol in consideration of appropriate physical properties of the prepared particles. According to one embodiment of the present invention, the thermoplastic polymer resin may be at least one polymer selected from the group consisting of polylactic acid (PLA), thermoplastic polyurethane (TPU), polyethylene (PE), polypropylene (PP), polyether sulfone (PES), poly(methyl methacrylate) (PMMA) and ethylene vinyl-alcohol copolymer (EVOH).

The extruder supplied with the thermoplastic polymer resin controls physical properties such as the viscosity of the thermoplastic polymer resin by heating and pressing the thermoplastic polymer resin. The type of extruder is not particularly limited as long as it can adjusted to have physical properties suitable for granulation at the nozzle. According to one embodiment of the present invention, the extruder may be a twin-screw extruder for efficient extrusion. The inside of the extruder may be preferably maintained at 150 to 450° C., preferably 170 to 400° C., more preferably 200 to 350° C. If the internal temperature of the extruder is less than 150° C., the viscosity of the thermoplastic polymer resin is high, which is not suitable for granulation at the nozzle, and also the thermoplastic polymer resin has low flowability in the extruder, thereby being not efficient for extrusion. In addition, if the internal temperature of the extruder is higher than 450° C., the flowability of the thermoplastic polymer resin is high, and thus efficient extrusion is possible, but if the thermoplastic polymer resin is granulated in the nozzle, it is difficult to control fine physical properties.

The extrusion amount of the thermoplastic polymer resin may be set to facilitate the physical properties of the thermoplastic polymer resin in consideration of the size of the extruder. According to one embodiment of the present invention, the thermoplastic polymer resin is extruded at a rate of 1 to 10 kg/hr. The viscosity of the extruded thermoplastic polymer resin may be 0.5 to 20 Pa·s, preferably 1 to 15 Pa·s, more preferably 2 to 10 Pa·s. If the viscosity of the thermoplastic polymer resin is less than 0.5 Pa·s, it is difficult to process the particles at the nozzle. If the viscosity of the thermoplastic polymer resin is more than 20 Pa·s, the flowability of the thermoplastic polymer resin at the nozzle is low, and thus the processing efficiency is lowered. The temperature of the extruded thermoplastic polymer resin may be 150 to 450° C.

The extruded thermoplastic polymer resin is supplied to the nozzle in the extruder. Along with the thermoplastic polymer resin, air is also supplied to the nozzle. The air contacts the thermoplastic polymer resin in the nozzle to granulate the thermoplastic polymer resin. Hot air is supplied to the nozzle to properly maintain the physical properties of the thermoplastic polymer resin. According to one embodiment of the present invention, the temperature of the air may be 250 to 600° C., preferably 270 to 500° C., more preferably 300 to 450° C. If the temperature of the air is less than 250° C. or more than 600° C., when thermoplastic polymer particles are produced from thermoplastic polymer resin, the physical properties of the surface in contact with air may be changed in an undesirable direction, which causes a problem. In particular, when the temperature of the air exceeds 600° C., excessive heat is supplied to the contact surface with the air, the decomposition phenomenon of the polymer may occur on the surface of the particles.

The supply position of the thermoplastic polymer resin and the air supplied to the nozzle is set such that the thermoplastic polymer particles can have an appropriate size and shape, and the formed particles can be evenly dispersed. FIG. 3 shows a cross-sectional view of the nozzle outlet, and the supply position of the thermoplastic polymer resin and air according to an embodiment of the present invention will be described in detail with reference to FIG. 3. For the detailed description herein, the positions of the nozzles are expressed as "inlet", "outlet", and "distal end". The "inlet" of the nozzle means the position where the nozzle starts, and the "outlet" of the nozzle means the position where the nozzle ends. In addition, the "distal end" of the nozzle means the position from two thirds of the nozzle to the outlet. Here, point 0 of the nozzle is the inlet of the nozzle and point 1 of the nozzle is the outlet of the nozzle.

As shown in FIG. 3, the cross-section perpendicular to the flow direction of thermoplastic polymer resin and air is a circle. The air is supplied through a first air stream (40) fed into the center of the circle and a second air stream (20) fed into the outer portion of the circle, and the thermoplastic polymer resin is supplied between the first air stream (40) and the second air stream (20). From the time the thermoplastic polymer resin and the air are supplied to the inlet of the nozzle to just before the outlet of the nozzle, each feed stream (the thermoplastic polymer resin stream (30), the first air stream (40) and the second air stream (20)) is separated by the internal structure of the nozzle. Just before the outlet of the nozzle, the thermoplastic polymer resin stream and the second air stream are merged to bring the thermoplastic polymer resin into contact with air, thereby granulating the thermoplastic polymer resin. In contrast, the first air stream is separated by the internal structure of the nozzle from the thermoplastic polymer resin stream and the second air stream until the air and the thermoplastic polymer resin are discharged from the nozzle. The first air stream serves to prevent the particles of the thermoplastic polymer resin granulated by the second air stream from adhering to the outlet of the nozzle and evenly disperse the discharged particles after discharging from the nozzle and before feeding to the cooling unit.

The extruded thermoplastic polymer resin in the extruder is all supplied to the above-mentioned position of the nozzle, the flow rate of air supplied to the nozzle can be adjusted depending on the flow rate of the extruded thermoplastic polymer resin. According to one embodiment of the present invention, the air is supplied to the nozzle at a flow rate of 1 to 300 m$^3$/hr, preferably 30 to 240 m$^3$/hr, more preferably 60 to 180 m$^3$/hr. The air is supplied separately into the first air stream and the second air stream within the flow rate range of the air. As described above, the thermoplastic polymer resin is granulated by the second air stream. The ratio of the thermoplastic polymer resin and the second air stream as well as the temperature of the second air stream may determine the physical properties of the particles. According to one embodiment of the present invention, the ratio of the cross-sectional areas of the thermoplastic polymer resin and the second air stream based on the cross section of the outlet of the nozzle may be 1:1 to 10:1, preferably 1.5:1 to 8:1, more preferably 2:1 to 6:1. If the ratio of the thermoplastic polymer resin and the second air stream is controlled within the above range, thermoplastic polymer particles having a suitable size and shape that have high utility can be manufactured.

Since the thermoplastic polymer resin is granulated at the nozzle, the inside of the nozzle is controlled to a temperature suitable for granulating the thermoplastic polymer resin. Since a sharp rise in temperature can change the structure of the polymer in the thermoplastic polymer resin, the temperature from the extruder to the outlet of the nozzle can be raised step by step. Therefore, the internal temperature of the nozzle is set on average to a range higher than the internal temperature of the extruder. Since the distal end temperature of the nozzle is defined separately below, the internal temperature of the nozzle herein means the average temperature of the rest of the nozzle except for the distal end of the nozzle unless otherwise specified. According to one embodiment of the present invention, the inside of the nozzle may be maintained at 250 to 450° C. If the internal temperature of the nozzle is less than 250° C., sufficient heat is not transferred to the thermoplastic polymer resin to satisfy the physical properties. If the internal temperature of the nozzle is above 450° C., excessive heat can be supplied to the thermoplastic polymer resin, thereby changing the structure of the polymer.

The distal end of the nozzle may be maintained at a temperature higher than the average temperature inside the nozzle to improve the external and internal physical properties of the resulting particles. The distal end temperature of the nozzle may be determined between the glass transition temperature ($T_g$) and the pyrolysis temperature ($T_d$) of the thermoplastic polymer, and specifically may be determined according to Formula 3 below:

$$\text{Distal end temperature} = \text{glass transition temperature } (T_g) + (\text{pyrolysis temperature } (T_d) - \text{glass transition temperature } (T_g)) \times A \quad \text{[Formula 3]}$$

wherein A may be 0.5 to 1.5, preferably 0.65 to 1.35, more preferably 0.8 to 1.2. If A is less than 0.5, it is difficult to expect the improvement of the external and internal physical properties of the particles according to the temperature rise at the distal end of the nozzle. If A is greater than 1.5, the heat substantially transmitted to the thermoplastic polymer at the distal end of the nozzle may be excessively increased, thereby deforming the structure of the thermoplastic polymer. The glass transition temperature and pyrolysis temperature may vary depending on the type, degree of polymerization, structure, and the like of the polymer. According to one embodiment of the present invention, the thermoplastic polymer having a glass transition temperature of −40 to 250° C. and a glass transition temperature of 270 to 500° C. Since the distal end of the nozzle is kept higher than the average temperature of the nozzle, in some cases, the distal end of the nozzle may be provided with additional heating means.

The discharged thermoplastic polymer particles at the nozzle are fed to the cooling unit. The nozzle and the cooling unit can be spaced apart, in which case the discharged thermoplastic polymer particles are primarily cooled by ambient air before being supplied to the cooling unit. the hot air as well as the thermoplastic polymer particles are discharged together from the nozzle. By separating the nozzle and the cooling unit, the hot air can be discharged to the outside instead of the cooling unit, thereby increasing the cooling efficiency in the cooling unit. According to one embodiment of the present invention, the cooling unit is located spaced apart from the nozzle at a distance of 100 to 500 mm, preferably 150 to 400 mm, more preferably 200 to 300 mm. If the separation distance is shorter than the distance, a large amount of hot air is injected into the cooling chamber, thereby lowering the cooling efficiency. If the separation distance is longer than the distance, the amount cooled by the ambient air is increased, the rapid cooling by the cooling chamber is not achieved. In addition, the injection angle when discharging the thermoplastic polymer particles in the nozzle may be 10 to 60°. When discharging thermoplastic polymer particles at a corresponding angle, the effect of the separation between the nozzle and the cooling unit can be doubled.

The cooling unit cools the thermoplastic polymer particles by supplying low temperature air into the cooling unit to contact the air with the thermoplastic polymer particles. The low temperature air forms a rotary airflow in the cooling unit, and the rotational airflow can sufficiently secure the retention time of the thermoplastic polymer particles in the cooling unit. The flow rate of air supplied to the cooling unit may be adjusted depending on the supply amount of thermoplastic polymer particles. According to one embodiment of the present invention, the air may be supplied to the cooling unit at a flow rate of 1 to 10 m³/min. The air may preferably have a temperature of −30 to −20° C. By supplying cryogenic air into the cooling unit in comparison with the thermoplastic polymer particles supplied to the cooling unit, the thermoplastic polymer particles are rapidly cooled to properly maintain the internal structure of the high temperature thermoplastic polymer particles during discharge. The thermoplastic polymer particles are reheated again when actually applied for the manufacture of the product. At this time, the reheated thermoplastic polymer has physical properties that are advantageous for processing. The thermoplastic polymer particles cooled by low temperature air are cooled to 40° C. or less and discharged. The discharged particles are collected through a cyclone or a bag filter.

Hereinafter, preferred examples are provided to aid the understanding of the present invention. However, the following examples are provided only to more easily understand the present invention, but the present invention is not limited thereto.

EXAMPLES

Example 1: Manufacture of Polylactic Acid Particles According to the Manufacturing Method of the Present Invention 100 wt. % of polylactic acid resin (Natureworks, 2003D, Mw: about 200,000 g/mol, glass transition temperature ($T_g$): about 55° C., pyrolysis temperature ($T_d$): about 300° C.) was fed to a twin-screw extruder (diameter (D)=32 mm, length/diameter (L/D)=40). The twin-screw extruder was set to a temperature condition of about 220° C. and an extrusion amount condition of about 5 kg/hr, and then proceeded with extraction. The extruded polylactic acid resin has a viscosity of about 10 Pa·s. The extruded polylactic acid resin was supplied to a nozzle set to the internal temperature of about 300° C. and the distal end temperature of about 350° C. (A value according to Formula 3 is about 1.2). In addition, air of about 350° C. was supplied to the nozzle at a flow rate of about 1 m³/min. The air was supplied to the central portion and the outer portion of the cross section of the nozzle, and the extruded polylactic acid resin was supplied between the central portion and the outer portion of the nozzle to which the air is supplied. The ratio of the cross-sectional areas of the air supplied to the outer portion and the extruded polylactic acid supplied between the central portion and the outer portion to which the air is supplied was about 4.5:1. The polylactic acid resin supplied to the nozzle was granulated by contact with hot air, and the granulated particles were ejected from the nozzle. The ejection angle from the nozzle was about 45° and the ejected particles were fed to a cooling chamber (diameter (D)=1,100 mm, length (L)=3,500 mm) spaced at a distance of about 200 mm from the nozzle. In addition, the cooling chamber was controlled to form a rotary airflow by injecting air at −25° C. at a flow rate of about 6 m³/min before the ejected particles are supplied. Particles sufficiently cooled down to 40° C. in the cooling chamber were collected through a cyclone or a bag filter.

Example 2: Manufacture of Thermoplastic Polyurethane Particles According to the Manufacturing Method of the Present Invention Particles were prepared in the same manner as in Example 1, except that 100 wt. % of thermoplastic polyurethane resin (Lubrizol, Pearlthane™ D91M80, Mw: about 160,000 g/mol, glass transition temperature($T_g$): about −37° C., pyrolysis temperature ($T_d$): about 290° C.) is used as a raw material.

Comparative Example 1: Manufacture of Polylactic Acid Particles by Freeze Crushing Method The same polylactic acid resin as in Example 1 was supplied to a screw feeder through a hopper. After removing the moisture while moving the raw material through the screw, the raw material was introduced into a crusher supplied with liquid nitrogen of −130° C. The crusher was a Pin Crusher-type crusher. Particle size was controlled via a crushing size determination pin. The particles granulated through the crusher were collected through a cyclone.

Experimental Example 1: Evaluation of Physical Properties of Particles

The physical properties of the particles manufactured according to Examples 1 and 2 and Comparative Example 1 were measured and shown in Table 1 below.

TABLE 1

| | Average particle diameter (μm)[1] | aspect ratio[2] | roundness[3] |
|---|---|---|---|
| Example 1 | 14.2 | 1.02 ± 0.01 | 0.98 ± 0.01 |
| Example 2 | 102.6 | 1.01 ± 0.01 | 0.99 ± 0.01 |
| Comparative Example 1 | 10.8 | 1.43 ± 0.41 | 0.74 ± 0.18 |

[1] The average particle diameter of the powder, which is an aggregate of particles, was derived using ImageJ (National Institutes of Health (NIH)) at room temperature. The major axis of each particle is the particle diameter. For the aggregate of particles, the number average value of each particle diameter is the average particle diameter.
[2] and [3] The formation of particles was analyzed by image-processing using the same device, and converting into a binary image and then digitizing the degree of spherical shape of individual particles, and the aspect ratio and roundness were derived by Formulas 1 and 2.

As shown in table 1, the thermoplastic polymer particles according to Examples 1 and 2 have a shape that is close to a sphere because the aspect ratio and roundness are measured close to 1, whereas the thermoplastic polymer particles according to Comparative Example 1 did not have a shape that is close to a sphere because the aspect ratio and roundness are measured to be slightly different from 1.

In the thermoplastic polymer particles prepared by the conventional freeze crushing method as in Comparative Example 1, the aspect ratio and roundness do not satisfy the level close to a sphere, and thus the thermoplastic polymer particles are not easily handled later as compared to the thermoplastic polymer particles of Examples 1 and 2.

Experimental Example 2: DSC Analysis

The particles prepared according to Examples 1 and 2 and Comparative Example 1 were DSC analyzed, and the results are shown in Table 2 below. Specifically, DSC curves were obtained by increasing the temperature from 0° C. to 200° C. under the rate of temperature rise of 10° C./min using differential scanning calorimetry (DSC, Perkin-Elmer, DSC8000). The glass transition temperature ($T_g$), the melting point ($T_m$), cold crystallization temperature ($T_{cc}$), and the difference between endothermic amount ($\Delta H1$) and exothermic amount ($\Delta H2$) were derived from each DSC curve.

TABLE 2

| | $T_g$ (° C.) | $T_m$ (° C.) | $T_{cc}$ (° C.) | $\Delta H1 - \Delta H2$ (J/g) |
|---|---|---|---|---|
| Example 1 | 55 | 140 | 98 | 36 |
| Example 2 | −37 | 136 | 34 | 6 |
| Comparative Example 1 | 59 | 146 | — | 42 |

According to Table 2, the thermoplastic polymer particles of Example 1 show a peak of the cold crystallization temperature at 98° C. and the thermoplastic polymer particles of Example 2 show a peak of the cold crystallization temperature at 34° C., whereas the thermoplastic polymer particles of Comparative Example 1 do not show a peak of such cold crystallization temperature.

Furthermore, it was confirmed that in the case of Example 1, the difference between the endothermic amount $\Delta H1$ and the exothermic amount $\Delta H2$ is about 36 J/g and in the case of Example 2, the difference between the endothermic amount $\Delta H1$ and the exothermic amount $\Delta H2$ is about 6 J/g. Unlike Example 1, it was confirmed that in the case of Comparative Example 1, the difference between the endothermic amount $\Delta H1$ and the exothermic amount $\Delta H2$ is about 42 J/g. It is understood that the polylactic acid particles of Example 1 have a relatively high exothermic amount because they have a property of generating heat before the particles are melted by the cold crystallization phenomenon.

If the thermoplastic polymer particles have a peak of cold crystallization temperature as in Examples 1 and 2, when performing the heating process using such particles, such particles may have an advantage that they can be processed at a low temperature, compared to the processing temperature of the thermoplastic polymer particles of Comparative Example 1.

Comparative Example 2: Manufacture of Polylactic Acid Particles by Solvent Polymerization The lactic acid was added to the xylene solvent and stirred, and then a tin-based catalyst and a polyol were added thereto and polymerized at a temperature of about 140° C. The polymer was dissolved in chloroform, precipitated in methanol, and then dried it finally to prepare polylactic acid particles having a size of 10 μm.

Comparative Example 3: Manufacture of Thermoplastic Polyurethane Particles by Solvent Polymerization Method A prepolymer was synthesized by adding an ester or ether-based polyol to the dimethylformamide solvent and stirring it, and then adding diisocyanate. Subsequently, the thermoplastic polyurethane particles having a size of 400 μm were finally prepared by adding a diol or diamine-based chain extender, which is a single molecule reactive at a temperature of 80° C.

Experimental Example 3: Analysis of Impurities in Particles

The impurity content of the particles prepared according to Examples 1 and Comparative Examples 2 and 3 was analyzed, and the results are shown in Table 3 below. Specifically, the residual solvent in the particles was measured using a GC/FID device (manufacturer: Agilent, model name: 7890A), and the heavy metals in the particles were measured using an ICP/MS device (manufacturer: Perkinelmer, model name: Nexion300). The impurity content of Table 3 described below is the sum of the content of the residual solvent and the content of the heavy metals in the particles.

TABLE 3

| | Impurity content (ppm) |
|---|---|
| Example 1 | 3 |
| Comparative Example 2 | 61 |
| Comparative Example 3 | 53 |

According to Table 3, it was confirmed that in the case of the particles of Comparative Example 2 and 3, since the solvent is used in the manufacture of the particles, the content of impurities is significantly higher than the particles of Example 1 due to the residual solvent in the particles. In contrast, the particles of Example 1 contained little impurities such as residual solvent except for trace impurities coming from the device during the manufacture of the particles.

All simple modifications or variations of the present invention fall within the scope of the present invention, and the specific scope of protection of the present invention will be clarified by the appended claims.

EXPLANATION OF SYMBOLS d: Vertical distance of two parallel tangent planes
A: Area
10: Nozzle
20: Second air stream
30: Thermoplastic polymer resin stream
40: First air stream

The invention claimed is:

1. Thermoplastic polymer particles formed from a thermoplastic polymer, wherein the thermoplastic polymer particles have an aspect ratio of 1.00 or more and less than 1.05 calculated by Formula 1 below and a roundness of 0.95 to 1.00 calculated by Formula 2 below:

Aspect ratio=major axis/minor axis,     Formula 1

Roundness=4×area/(Π×major axis^2),     Formula 2 wherein an impurity content of the thermoplastic polymer particles is 50 ppm or less.

2. The thermoplastic polymer particles according to claim 1, wherein the thermoplastic polymer particles are formed as a continuous matrix phase from the thermoplastic polymer.

3. The thermoplastic polymer particles according to claim 1, wherein the thermoplastic polymer particles have a peak of cold crystallization temperature ($T_{cc}$) at a temperature between a glass transition temperature ($T_g$) and a melting point ($T_m$) in a differential scanning calorimetry (DSC) curve derived from temperature rise analysis of 10° C./min by the DSC.

4. The thermoplastic polymer particles according to claim 1, wherein the thermoplastic polymer is at least one polymer selected from the group consisting of polylactic acid (PLA), thermoplastic polyurethane (TPU), polyethylene (PE), polypropylene (PP), polyether sulfone (PES), poly(methyl methacrylate)(PMMA), and ethylene vinyl-alcohol copolymer (EVOH).

5. The thermoplastic polymer particles according to claim 1, wherein a particle diameter of the thermoplastic polymer particles is 1 to 1000 μm.

* * * * *